Patented Jan. 2, 1923.

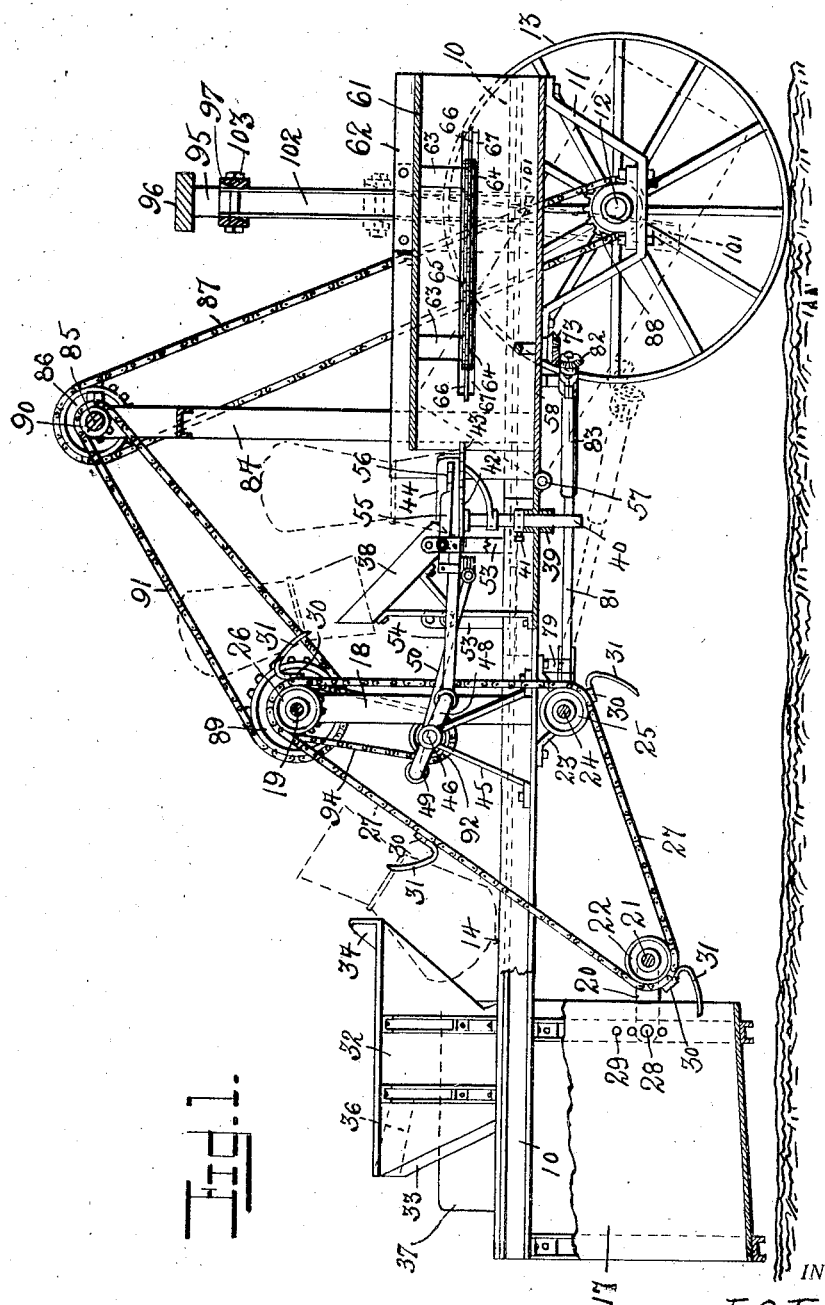

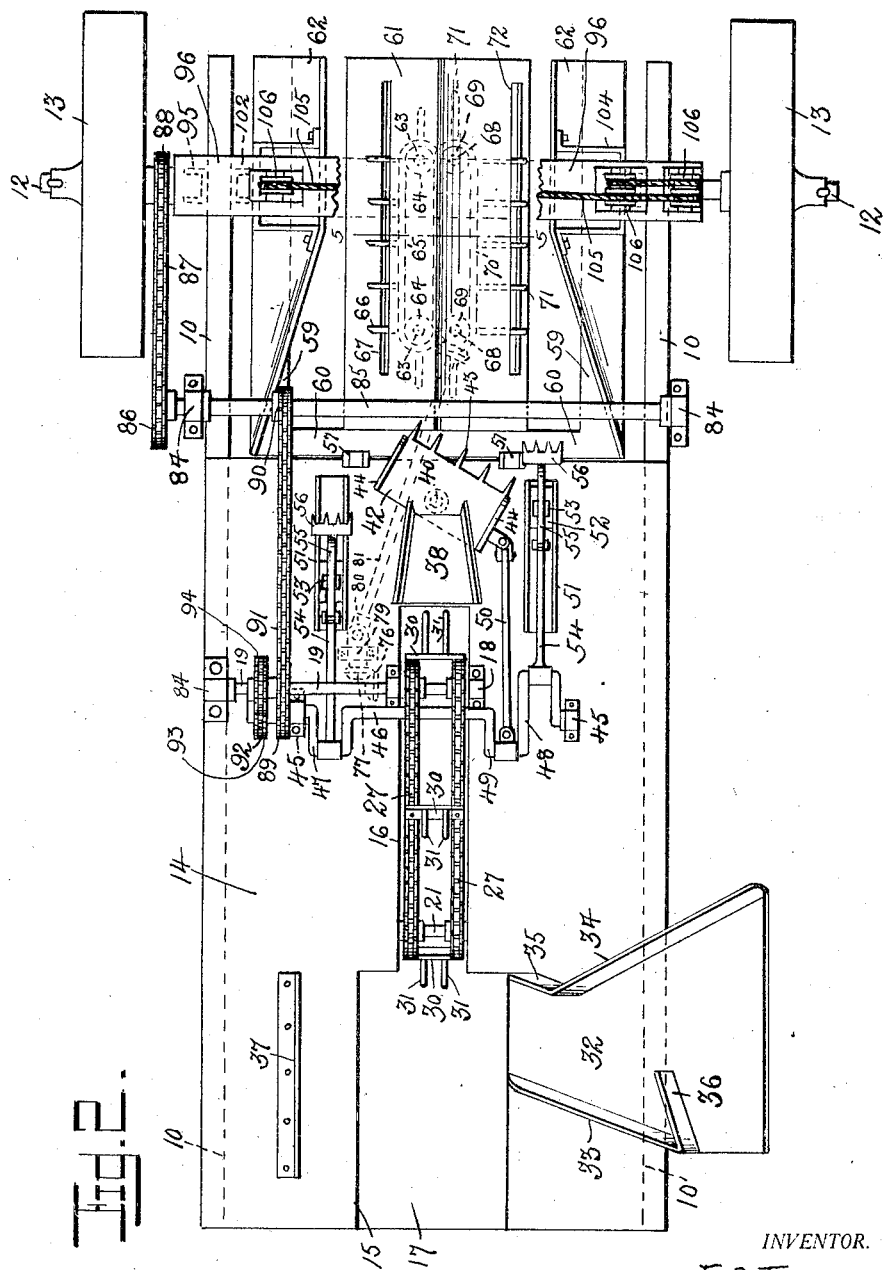

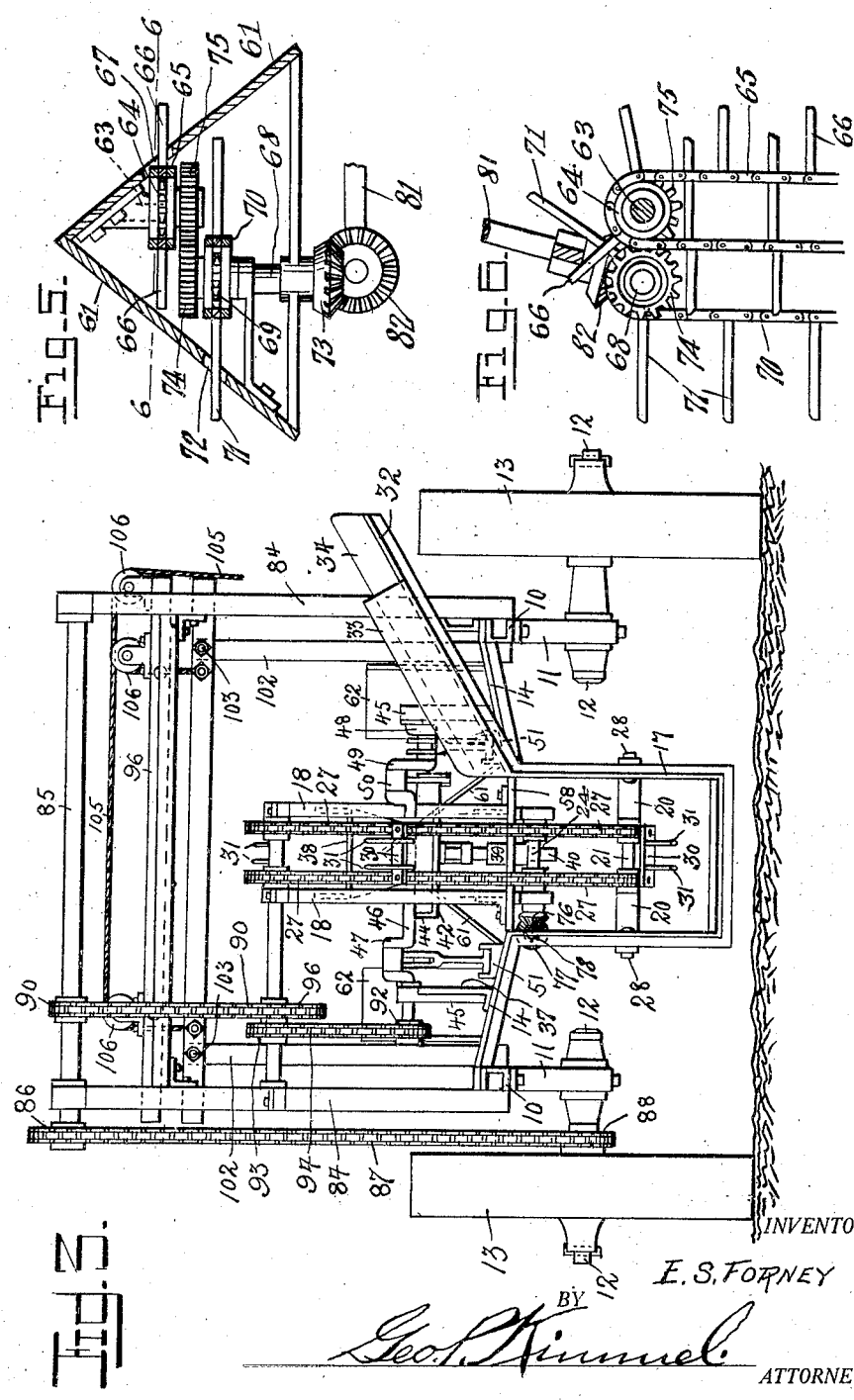

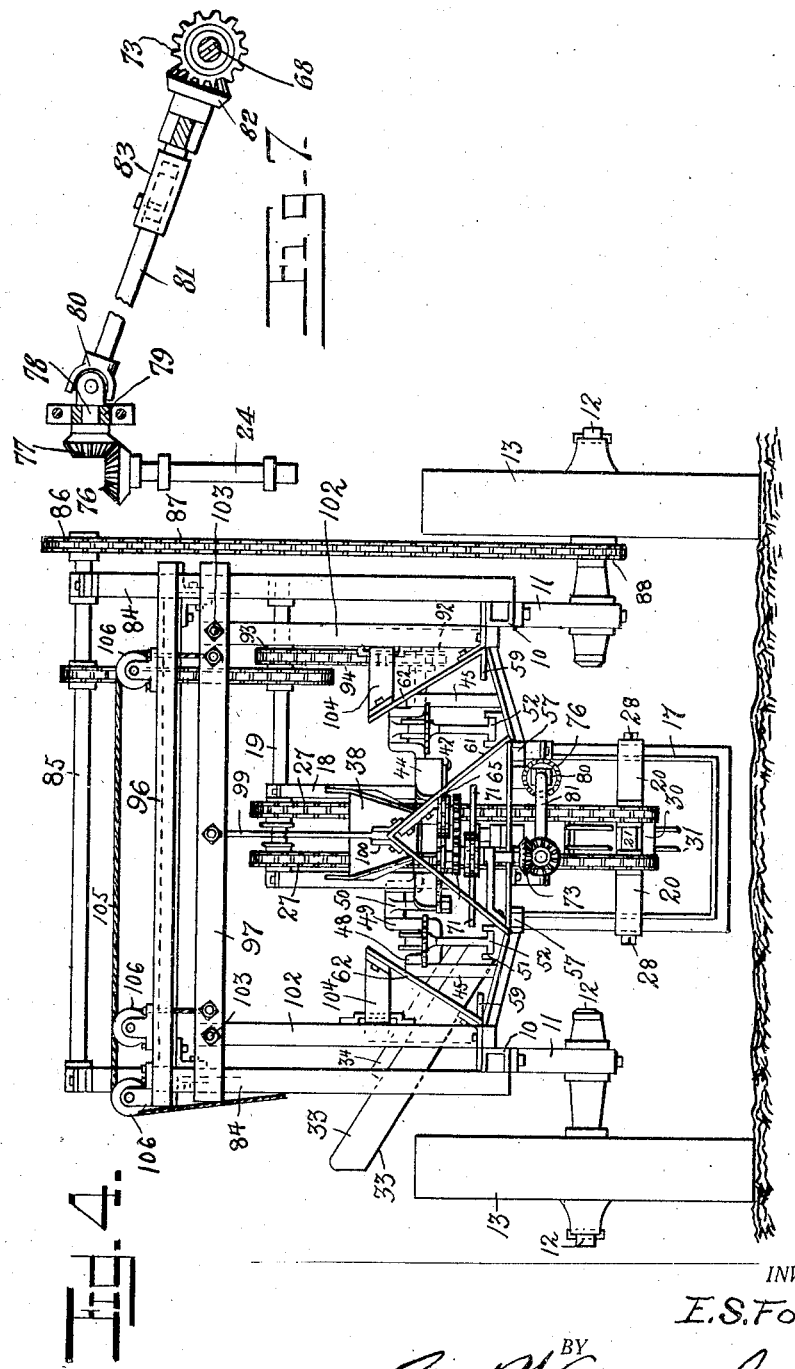

1,441,076

UNITED STATES PATENT OFFICE.

ERNEST S. FORNEY, OF FULLERTON, NEBRASKA.

GRAIN SHOCKER.

Application filed September 18, 1920. Serial No. 411,165.

*To all whom it may concern:*

Be it known that I, ERNEST S. FORNEY, a citizen of the United States, residing at Fullerton, in the county of Nance and State of Nebraska, have invented certain new and useful Improvements in a Grain Shocker, of which the following is a specification.

This invention relates to grain shockers, and has for one of its objects to simplify and improve the construction and increase the efficiency and utility of devices of this character.

Another object of the invention is to provide a device of this character adapted to be connected to a harvester and binder and movable therewith, to receive the bound bundles from the harvester and gather them into a receptacle and dispose them therein in position to form a shock and discharge the same upon the ground at predetermined intervals.

This invention relates to grain shockers, of the class associated with a harvester and binder, and has for one of its objects to provide a device of this character wherein the bound bundles of grain as they are received from the binder mechanism, are first turned with their head ends directed downwardly, then elevated in that position and reversed with the butt ends directed downwardly, and thence alternately fed to a receiver wherein the bundles are divided and caused to lean toward each other, and discharged in that position to form a shock with the base portion extended laterally to secure the requisite stability.

With these and other objects in view, the invention consists in certain novel features of construction as hereinafter shown and described and then specifically pointed out in the claims, and in the drawings illustrative of the preferred embodiment of the invention.

Figure 1 is a longitudinal sectional elevation.

Fig. 2 is a plan view with parts broken away to disclose the construction of certain parts.

Fig. 3 is a front elevation.

Fig. 4 is a rear elevation.

Figure 5 is an enlarged sectional detail on the line 5—5 of Figure 2.

Figure 6 is a plan view of the parts shown in Figure 5 without the hood member and with one of the shafts and the supporting bracket in section on the line 6—6 of Figure 5.

Fig. 7 is an enlarged detail of the drive mechanism between the bundle elevator operating mechanism and the discharge mechanism.

The improved device includes a supporting frame having spaced side rails 10 provided with hangers or brackets 11 at the rear to support stub axles 12, the latter having carrier wheels 13.

At their forward ends the supporting frame is adapted to be suitably coupled to the frame work of a harvester and binder, not shown, as it forms no part of the present invention.

The forward portions of the members 10 are connected by a floor, or platform, represented as a whole at 14, the floor having a relatively wide recess or opening 15 at the front end and a relatively narrow opening 16 leading rearwardly therefrom.

Suspended from the portions of the floor at the sides of the opening 15 is a U-shaped preliminary receiver 17 for the bound bundles as they come from the binder, as hereafter explained.

Rising from the floor 14 rearwardly of the opening 15 and at the sides of the opening 16 are standards 18 supporting a shaft 19 at their upper ends, and supported by a hanger frame 20 from the side walls of the receiver 17, is a short shaft 21 carrying guide pulleys 22.

Supported by hangers 23 beneath the floor 14 is another short shaft 24 carrying guide pulleys 25, and mounted for rotation with the shaft 19 are chain wheels 26. The pulleys 22 and 25 and chain wheels 26 are in alinement and carry endless chains 27 operating over the wheels and pulleys in constant parallel relation.

The hanger members 20 are coupled to the receiver 17 by bolts 28 engaging through graduated bolt holes 29, so that the hangers may be adjusted, to control the tension of the chains.

Attached across the chains 27 at suitable intervals are head members 30 each carrying a plurality of fork tines 31, which engage the bound bundles of grain as they are fed to the receiver 17 and elevated therefrom, as hereafter explained.

Mounted on the floor 14 at one side of the receiver 17, is a chute for the bound bundles so located relatively to the binder that the bound bundles will be fed thereto longitudinally of the frame members 10. The chute comprises an inclined bottom member 32 having converging vertical sides or guides 33 and 34 whereby a contracted discharge is produced into the receiver 17.

At its lower end the guide 34 is diverted rearwardly as shown at 35 and substantially parallel to the guide member 33, so that the discharge end of the chute is directed rearwardly to turn the bundles toward the forks 31 of the chain.

The guard member 33 is shorter than the member 34, and is deflected as shown at 36 over the bottom 32 of the chute and toward the discharge end, as shown more clearly in Fig. 2.

The bound bundles of grain from the binder are deposited upon the wider upper end of the bottom 32 with the butt ends forwardly, or next to the stop member 36, and as the bundles roll down the chute, the member 36 retards the butt ends and turns the bundles end for end and causes them to pass into the receiver butt ends up, and are caught by the forks 31 and carried upwardly in that position.

A vertical guard plate 37 is attached to the floor 14 opposite the opening 15 to prevent the bundles being thrown from the receiver during the elevating operation.

Supported from the floor 14 rearwardly of the standards 18, is an inclined conductor chute 38, preferably with vertical inclined sides, and in position to receive the bundles from the forks 31 as they are carried over the shaft 19.

Supported upon the floor 14 slightly in advance of the lower or discharge end of the chute 38 is a socket 39 to rotatably support a vertical shaft or stud 40, the latter having a set collar 41 to enable the stud to be adjusted vertically in the socket without interfering with its free rotary movement.

Mounted upon the upper end of the stud 40 is a horizontal plate 42 preferably with tines or teeth 43 extending from its rear edge and with vertical guards 44 at the ends.

Supported by standards 45 from the floor 14 is a shaft 46 having cranks 47 and 48 at the ends extending in opposite directions, and a third crank 49 preferably extending in the same direction as the crank 47. The crank 49 is connected to the plate 42 by a rod 50, so that when the shaft 46 is rotated, the plate 42 will be vibrated with the stud 40.

Mounted upon the floor 14 at each side of the chains 27 are guide ribs 51, and slidable between each set of the guide ribs is a plate 52 having standards 53 rising therefrom. Connected to each of the cranks 47 and 48 is a rod 54 the free ends of the rods being connected in turn respectively to the standards 53, so that when the shaft 46 is rotated, the standards 53 and the plates 52 will be vibrated and by the coaction of the plates and guides 51 the standards will move in constant parallel relation to the floor 14.

At their upper ends the standards 53 are forked and supported between each forked portion is a bar 55 having a fork device 56 at the free end.

The forked portions of the standards 53 are each provided with a plurality of spaced apertures, so that pins by which the members 54 are coupled to the standards may be adjusted vertically to elevate or depress the forked device 56.

Hingedly united at 57 to the rear edge of the floor 14 is a combined receiving and dumping apparatus comprising a base or floor portion divided into a relatively wide central portion 58, narrower side portions 59 and a connecting forward portion 60, the hinges 57 being attached to the latter and to the rear edge of the floor 14, as shown.

Mounted upon the wider central floor portion 58 is an A-shaped shell 61, the forward end of the shell being relatively close to the plate 42. Rising from the narrow floor sections 59 are guide plates 62 with the rear portions inclined inwardly, or toward the shell 61, and the forward portions gradually assuming a vertical position. By this arrangement two passages are produced between the side walls of the shell 61 and the guide members 62 with relatively wide intake ends and merging into inwardly inclined discharge ends, as shown. The portions 59 form relatively narrow supporting shelves at the lower edges of the guide members 62, to support the butt ends of the bundles while passing through the gathering portion of the apparatus as hereafter explained.

Supported upon the inner face of one wall of the shell 61 are vertical stub shafts 63 carrying chain wheels 64 around which an endless chain 65 operates. The chain 65 carries outwardly directed carrier fingers 66 which project through a slot 67 in the adjacent wall of the shell when the chain is moved in one direction.

Supported from the other wall of the shell 61 are stub shafts 68 carrying chain wheels 69 around which an endless chain 70 operates, the latter chain carrying outwardly directed carrier fingers 71 operating through a longitudinal slot 72 in the adjacent wall of the cage. The forward stub shaft 68 is extended downwardly and terminates in a bevel gear 73, while the shaft which carries the bevel gear is likewise provided with a gear pinion 74 at its upper end meshing with a like gear 75 on the adjacent shaft 63.

By this means when motion is imparted to the bevel gear 73 the chains 65 and 70 will be operated in opposite direction and cause the fingers 66 and 71 to travel in the same direction or from front to rear of their respective passages between the inclined walls of the shell and the guard members 62.

The shaft 24 is extended at one end and carries a bevel gear 76 which engages a like bevel gear 77 on a stub shaft 78 supported by a hanger 79 below the floor 14. The stub shaft 78 carries a universal coupling 80 to which an obliquely directed shaft 81 is coupled and carries a bevel gear 82 at the rear end engaging with the bevel gear 73.

By this means the motion of the shaft 24 is transmitted to the chains 65 and 70. The shaft 81 is formed with a slip sleeve 83, to permit the requisite automatic adjustment when the floor members 58, 59 and 60 are depressed into the position shown by dotted lines in Fig. 1, when the gathered shock is discharged as hereafter explained.

Rising from the frame members 10 are standards 84 carrying a main drive shaft 85 at their upper ends and with a chain pulley 86, over which an endless chain 87 leads.

The hub of one of the wheels 13 is provided with a chain wheel 88 over which the chain 87 leads. By this means the motion of the wheel 13 which carries the chain wheel 88 is imparted to the drive shaft 85.

Mounted on the shaft 19 is a chain wheel 89, and mounted on the shaft 85 is a chain wheel 90, the wheels 89 and 90 being in vertical alinement to receive an endless chain 91, whereby the motion of the shaft 85 is transmitted to the shaft 19 and thence to the elevator chains 27.

The crank shaft 46 is extended at one end and carries a chain gear 92, while the shaft 19 carries a chain wheel 93 in alinement therewith to receive an endless chain 94 whereby the motion of the shaft 19 is transmitted to the crank shaft.

Rising from the frame members 10 are standards 95, and attached to the standards at their upper ends is a transverse head member 96.

Slidably disposed upon the standards 95 are guide bars 97, and connected to the guide bars is a suspension rod 99, the latter coupled at 100 at its lower end to the shell 61.

Pivoted at 101 at their lower ends to the guard members 62, are suspension bars 102, the bars being pivoted at their upper ends at 103 between the guide bars 97.

The bars 102 are flexible laterally on the pivots 103 to permit the necessary play when the shell 61 and guards 62 are disposed in discharging position, as shown by dotted lines in Fig. 1.

Keepers 104 are arranged to slidably couple the bars 102 to the guard members 62, to hold the latter in position during the discharging action.

Any suitable means may be employed for actuating the bars 97 to elevate and depress the shell 61 and guards 62, but for the purpose of illustration a system of pull cables 105 operating over guide pulleys 106 mounted on the head member 96 are shown for accomplishing this result.

With an apparatus constructed as shown and described, the operation is as follows.

The apparatus being coupled to move with the harvester and binder, as the bundles leave the binder they are received on the chute 32 and turned one-fourth around endwise as they pass over the same and are fed to the receptacle 17 with the butt ends up and are caught by the forks 31 and carried up and over the shaft 19 and delivered to the chute 38 butt ends down and pass thence to the plate 42. The bound bundles being engaged lengthwise of the straw and cross-wise of the binder twine by the teeth 31 of the elevator, no danger exists of the teeth slipping and rolling the bundles under the action of the elevator teeth, but the grip is positive and sure and no lost motion is possible. In the meantime the crank 49 has vibrated the plate to cause it to alternately assume the position shown in Fig. 2 or its opposite, and the movements are so timed that the plate is vibrated once between the delivery of each bundle thereon, hence one bundle will be received on the plate when in one oblique position, and the next bundle received on the plate when in reversely oblique position.

When disposed in the position shown in Fig. 2 the plate 42 will deflect the bundle received thereon into the passage between the shell 61 and guard 62 at one side and when the plate 42 is reversed in position the bundle will be deflected into other passage.

The fork devices 56 operate as push rakes to force the bundles from the plate 42 alternately into the receptacles formed by the shell and guards, the push rakes or forks operating alternately, as shown.

As the bundles are alternately fed to the two parts of the receptacle, the constantly moving fingers 66 and 71 carry them toward the discharge end and when a sufficient number have been received to form a shock, for instance 5 on each side of the shell, the cable 105 will be manually released and the floor 59 and 60 with its attachments caused to swing by gravity on its hinges 57 into the position shown by dotted lines in Fig. 1 and thus discharge the accumulated bundles with their head ends leaning against each other with the butt ends dragging over the stubble and thus insuring the requisite stability to cause the shock to retain its position.

After the shock has been discharged, which takes but an instant, and will be timed to occur between the delivery of the bundles to the plate 42, the cables 105 are manually operated to restore the receptacle to receiving position ready for the next operation.

I claim:

1. In an apparatus of the class described, a receiver for the bound bundles, means for disposing the bundles head ends down in the receiver, means for elevating the bundles from the receiver and reversing them in position, a divided receptacle for the bundles, a horizontally swinging platform between the receptacle and the elevating means to receive the bundles therefrom, and means for intermittently swinging said platform to feed the bundles alternately into the divisions of the receptacle.

2. In an apparatus of the class described, a receiver for the bound bundles, means for elevating the bundles from the receiver, a divided receptacle for the bundles, a horizontally swinging platform in position to receive the bundles from the elevating means, and means for intermittently swinging said platform to feed the bundles alternately into the divisions of the receptacle.

3. In an apparatus of the class described, a receiver for bound bundles, means for elevating the bundles from the receiver, a receptacle comprising an A shaped central portion and inwardly inclined side portions spaced from the central portion whereby the receptacle is divided into reversely inclined portions, means between the receptacle and the elevating means for alternately conducting the bundles to the divisions of the receptacle, and endless chains movable within said A shaped portion and having teeth extending into the paths of the bundles.

4. In an apparatus of the class described, a receiver for the bound bundles, means for elevating the bundles, a receptacle comprising an A shaped central portion and inwardly inclined side portions spaced from the central portion whereby the receptacle is divided into reversely inclined portions, means between the receptacle and the elevating means for alternately conducting the bundles to the divisions of the receptacle, and means for forcibly moving the bundles through the divisions of the receptacle.

5. In an apparatus of the class described, a receiver for the bound bundles, means for elevating the bundles from the receiver, a divided receptacle for the bundles, a horizontal swinging platform in position to receive the bundles from the elevating means, means for intermittently swinging said platform to alternately feed the bundles toward the divisions of the receptacle, rake devices coacting with the swinging platform to move the bundles alternately from the platform to the receptacle divisions, and means for actuating the platform and the rake devices.

6. In an apparatus of the class described, a receiver for the bound bundles, means for elevating the bundles from the receiver, a divided receptacle for the bundles, a horizontally swinging platform in position to receive the bundles from the elevating means, means for intermittently swinging said platform to alternately feed the bundles toward the divisions of the receptacle, stationary guide devices in parallel relation, rake devices supported for movement relative to said guide devices, and means for alternately moving said rake devices to move the bundles from the platform to the receptacle.

In testimony whereof, I affix my signature hereto.

ERNEST S. FORNEY.